United States Patent [19]

Drent

[11] Patent Number: 4,818,811

[45] Date of Patent: Apr. 4, 1989

[54] TERPOLYMER OF CARBON MONOXIDE AND ETHYLENICALLY UNSATURATED MONOMERS

[75] Inventor: Eit Drent, Amsterdam, Netherlands

[73] Assignee: Shell Oil Company, Houston, Tex.

[21] Appl. No.: 89,374

[22] Filed: Aug. 26, 1987

[30] Foreign Application Priority Data

Oct. 30, 1986 [NL] Netherlands ............ 8602733

[51] Int. Cl.$^4$ ............................................. C08G 67/02
[52] U.S. Cl. ..................................... 528/392; 528/271
[58] Field of Search .............................. 528/392, 271

[56] References Cited

U.S. PATENT DOCUMENTS

| | | | |
|---|---|---|---|
| 2,495,286 | 1/1950 | Brubaker | 260/63 |
| 3,689,460 | 9/1972 | Nozaki | 260/63 |
| 3,694,412 | 9/1972 | Nozaki | 260/63 |
| 4,474,978 | 10/1984 | Drent | 560/24 |
| 4,634,793 | 1/1987 | Drent | 560/243 |

FOREIGN PATENT DOCUMENTS

| | | |
|---|---|---|
| 121965 | 8/1984 | European Pat. Off. . |
| 181014 | 5/1986 | European Pat. Off. . |
| 213671 | 3/1987 | European Pat. Off. . |
| 1081304 | 3/1965 | United Kingdom . |
| 2058074 | 8/1979 | United Kingdom . |

OTHER PUBLICATIONS

Kirk Othmer Encyclopedia of Chemical Technology, Second Edition, vol. 12, p. 132, 1967.

Primary Examiner—Harold D. Anderson

[57] ABSTRACT

Novel polyketone polymers containing pendant ether, amide or phosphonate groups are produced from carbon monoxide, an ethylenically unsaturated hydrocarbon and a vinyl compound selected from vinyl ethers, vinyl amides and vinyl phosphonates. The polymerization is conducted in the presence of a catalyst formed from compounds of certain Group VIII metals, anions of non-hydrohalogenic acids having a pKa less than about 4 and bidentate ligands of phosphorus or nitrogen.

16 Claims, No Drawings

TERPOLYMER OF CARBON MONOXIDE AND ETHYLENICALLY UNSATURATED MONOMERS

This invention relates to terpolymers of carbon monoxide and at least two different ethylenically unsaturated compounds. Members of one well known class of polymers of carbon monoxide and at least one ethylenically unsaturated hydrocarbon are known as polyketones. When these polymers are produced in the presence of a catalyst formed from a compound of certain Group VIII metals, i.e., compounds of palladium, nickel or cobalt, an anion of a non-hydrohalogenic acid having a pKa less than about 6 certain bidentate ligands of phosphorus or nitrogen, the polymers are linear alternating polymers of the formula

where Z represents the moiety of the ethylenically unsaturated hydrocarbon(s) polymerized through the ethylenic unsaturation. Such polymers are thermoplastic polymers with good mechanical properties in a number of applications. Because of the regular presence of carbonyl groups in the polymer chain, the polyketones are chemically modified, if desired, through the carbonyl groups to produce other polymers with modified properties. For example, catalytic hydrogenation of the polyketone polymers leads to the formation of polyalcohols or polyamines if ammonia is additionally present. Condensation of the polyketones with a phenol leads to a class of polyphenols and catalytic hydrogenation in the presence of hydrogen sulfide results in the production of polythiols.

When a portion of the ethylenically unsaturated hydrocarbon is replaced with an unsaturated ester such as vinyl acetate or methyl methacrylate, units containing carbonyloxy substituents are introduced into the polymer chain. Such units provide increased functionality in the polymer chain and an even wider variety of applications becomes possible. Nevertheless, it would yet be of advantage to provide polyketone polymers having additional types of functional substituents on the polymer chain.

SUMMARY OF THE INVENTION

It has now been found that novel polyketone terpolymers containing ether, amide or phosphonate substituents are produced by polymerizing carbon monoxide, an ethylenically unsaturated hydrocarbon and a vinyl compound selected from vinyl ethers, vinyl amides and vinyl phosphonates. The polymerization is conducted in the presence of a Group VIII metal compound wherein the metal is palladium, nickel or cobalt, an anion of a non-hydrohalogenic acid having a pKa less than about 4 and certain bidentate ligands of phosphorus or nitrogen.

DESCRIPTION OF THE INVENTION

The polymers of the invention are produced by contacting carbon monoxide, an ethylenically unsaturated hydrocarbon and a vinyl compound selected from vinyl ethers, vinyl amides and vinyl phosphonates, under polymerization conditions, in the presence of certain catalytic compositions.

The ethylenically unsaturated hydrocarbon is a hydrocarbon of from 2 to 20 carbon atoms inclusive, preferably from 2 to 10 carbon atoms inclusive, and for best results is an α-olefin. Illustrative of such α-olefins are aliphatic α-olefins such as ethylene, propylene, 1-butene, 1-octene and 1-dodecene, as well as arylaliphatic α-olefins having an aryl substituent on a carbon atom of the ethylenic unsaturation such as styrene, p-ethylstyrene and m-methylstyrene. Particularly preferred as the ethylenically unsaturated hydrocarbon is ethylene.

The vinyl compound is a compound of from 3 to 30 carbon atoms inclusive, preferably from 3 to 15 carbon atoms inclusive and contains a vinyl group, i.e., a $CH_2=CH-$ group, as a substituent of an ether, amide or phosphonate functional group. The vinyl compound is preferably hydrocarbyl, that is, contains only atoms of carbon and hydrogen, besides the oxygen, nitrogen and/or phosphorus atoms of the ether, amide or phosphonate groups.

When the vinyl compound is a vinyl ether, it is represented by the formula

   I wherein $R_1$ is hydrocarbyl of from 1 to 13 carbon atoms and is alkyl or aryl. Illustrative of such vinyl ethers are methyl vinyl ester, ethyl vinyl ether, propyl vinyl ether, benzyl vinyl ether and phenyl vinyl ether. Alkyl vinyl ethers are generally preferred over the aryl vinyl ethers and particularly preferred is ethyl vinyl ether.

When the vinyl compound is a vinyl amide, two types of compound may be employed which differ in the location of the vinyl group on the amide moiety. One class of amides is of the general formula

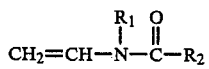   II wherein $R_1$ has the previously stated meaning and $R_2$ is $R_1$, H or such that $R_1$ and $R_2$ taken together form an α-Ω-alkylene group of from 2 to 6 carbon atoms inclusive, i.e., a $-(CH_2)_n-$ group wherein n is from 2 to 6 inclusive. Suitable amides of formula II are N-vinylacetamide, N-vinylbenzamide, N-vinylpyrrolidone, N-vinyl-N-methylacetamide, N-vinyl-N-phenylbenzamide, N-vinyl-N-methylbenzamide and N-vinyl-N-phenylacetamide. N-vinylpyrrolidone is a particularly useful vinyl amide of the formula II type.

The vinyl amide compound may also be of the formula

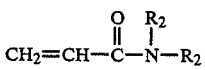   III wherein $R_2$ has the previously stated meaning. Illustrative of vinyl amides of the formula III type are acrylamide, N,N-dimethylacrylamide, N,N-diethylacrylamide and N,N-diphenylacrylamide.

When a vinyl phosphonate is employed as the vinyl compound, again there are two types of phosphonate that are suitable monomers, varying by the location of the vinyl group on the phosphonate linkage. One type of such phosphonates is illustrated by the formula

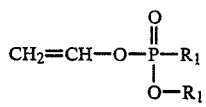

wherein $R_1$ has the previously stated meaning. Illustrative of such vinyl phosphonates of formula IV are O-vinyl-O'-methylmethylphosphonate and O-vinyl-O'-methylphenylphosphonate.

Also suitable as the vinyl phosphonate compound are those of the formula

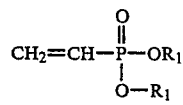

wherein $R_1$ has the previously stated significance. Illustrative vinyl phosphonates of the formula V type are O,O'-dimethylvinylphosphonate, O,O'-diethylvinylphosphonate, O-methyl-O'-phenylvinylphosphonate and O,O'-diphenylvinylphosphonate.

When a vinyl phosphonate is to be employed as the vinyl compound for the polymers of the invention, O,O'-diethylvinylphosphonate is preferred.

The polymer products of the invention containing moieties of carbon monoxide, ethylenically unsaturated hydrocarbon and moieties of the vinyl compound are represented by the formula

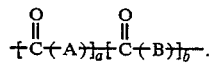

wherein A is the moiety of the α-olefin polymerized through the ethylenic unsaturation and B is the moiety of the vinyl compound polymerized through the vinyl linkage. In terms of the above formulas of classes of vinyl compound, B is selected from the moieties

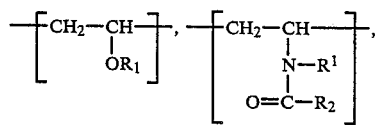

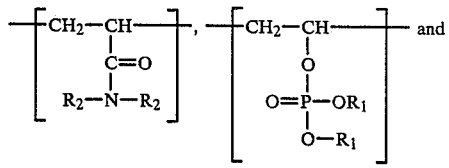

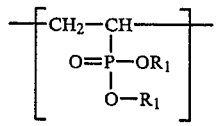

wherein $R_1$ and $R_2$ have the previously stated meanings. It should be appreciated that the above moieties are illustrated without designation as to which of several modifications is actually present in the polymer chain. For example when B represents a vinyl ether, the actual configuration of the unit in the polymer chain may be

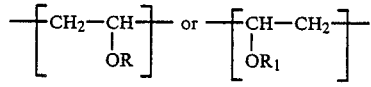

or mixtures thereof without detracting from the invention.

Although A may represent the moiety of one of a number of α-olefins, in the preferred embodiment A represents the moiety derived from ethylene, i.e., —$CH_2$—$CH_2$—.

The preferred polymers of the invention will frequently have an excess of A units over B units in the polymer chain of formula VI. In alternate terms, the ratio of a:b will be from about 1:1 to about 2000:1 and preferably from about 10:1 to about 1500:1.

The polymer products of the invention are produced by contacting the carbon monoxide, α-olefin and vinyl compound in the presence of a catalyst formed from a palladium compound, an anion of a non-hydrohalogenic acid having a pKa less than about 4 (determined in aqueous solution at 18° C.) and a bidentate ligand of phosphorus or nitrogen.

The palladium compound employed in the catalyst of the invention is a palladium salt of an organic acid, preferably a carboxylic acid of up to 10 carbon atoms. Although palladium salts such as palladium propionate or palladium hexanoate are suitable, palladium acetate is a preferred palladium compound.

The anion employed in the catalyst composition is the anion of a non-hydrohalogenic acid having a pKa less than about 4, preferably less than about 2. Preferred anions are anions of oxygen-containing acids including anions of inorganic acids such as sulfuric acid, phosphoric acid, nitrous acid or perchloric acid or anions of organic acids including carboxylic acids such as trichloroacetic acid, trifluoroacetic acid and difluoroacetic acid as well as sulfonic acids such as methanesulfonic acid, trifluoromethanesulfonic acid and para-toluenesulfonic acid. Anions of trifluoroacetic acid and p-toluenesulfonic acid constitute a preferred class of anions for the catalyst composition of the invention.

The anion is provided in the form of the acid or alternatively is provided as a salt. When provided as a salt, metal salts wherein the metal is a transition metal of Group IB through Group VIIB of the Periodic Table of Elements are suitable. When a transition metal salt is employed, copper salts have been formed to be particularly useful. The anion is provided in a quantity from about 0.5 to about 200 equivalents per gram atom of palladium (as the compound), preferably from about 1 to about 100 equivalents per gram atom of palladium. In yet another modification, the palladium compound and the anion are provided as a single compound, e.g., palladium para-tosylate (para-toluenesulfonate).

The bidentate ligand useful in the catalyst composition of the invention is a bidentate ligand of phosphorus or a bidentate ligand of nitrogen. In the case of bidentate phosphorus ligand, suitable ligands are represented by the formula

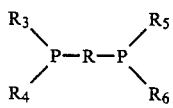

wherein $R_3$, $R_4$, $R_5$ and $R_6$ independently have from 6 to 20 carbon atoms inclusive, preferably from 6 to 10 carbon atoms inclusive, and are aryl including alkaryl or alkoxyaryl. Illustrative of such groups are phenyl, tolyl, 4-ethylphenyl, 2,4-dimethylphenyl, 4-methoxyphenyl, 2-ethoxyphenyl and 3-propoxyphenyl. The group R is a divalent hydrocarbyl bridging group of from 2 to 20 carbon atoms inclusive preferably from 2 to 10 carbon atoms with from 2 to 4 carbon atoms in the phosphorus-phosphorus bridge. The preferred R group is the trimethylene group, i.e., —CH$_2$—CH$_2$—CH$_2$—.

Examples of suitable bidentate ligands of phosphorus are 1,3-bis(di-p-tolylphosphino)propane, 1,3-bis[di(p-methoxyphenyl)phosphino]propane, 1,3-bis(diphenylphosphino)propane, 1,3-bis[di(2,4-dimethoxyphenyl)phosphino]propane and 1,3-bis[di(2,4,6-trimethoxyphenyl)phosphino]propane. The preferred bidentate phosphorus ligand is 1,3-bis(diphenylphosphino)propane.

When a bidentate phosphorus ligand is employed in the catalyst of the invention, quantities from about 0.1 mol to about 5 mol per mol of palladium compound are satisfactory with from about 0.5 mol to about 1.5 mol per mol of palladium compound being preferred.

The bidentate nitrogen ligands of the catalysts of the invention are ligands of the formula

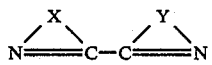

wherein X and Y independently are divalent bridging groups of from 2 to 10 carbon atoms inclusive with from 3 to 4 atoms in the bridge, at least 2 of which are carbon atoms and any other atoms in the bridge being nitrogen atoms. Illustrative of such bidentate nitrogen ligands are the 2,2'-bipyridines, the 1,10-phenanthrolines, the 2,2-biquinilones, the 2-(2-pyridyl)benzimidazolines, and the 3-(2-pyridyl)-5,6-diphenyl-1,2,4-triazines.

The preferred class of bidentate nitrogen ligands are the 2,2'-bipyridines wherein the ring carbon atoms are unsubstituted (except with hydrogen) or are substituted with alkyl groups, e.g., lower alkyl groups of from 1 to 4 carbon atoms such as methyl, ethyl or butyl, with halo groups, particularly chloro, or with alkoxy wherein the alkyl moiety is lower alkyl. Substitution of the pyridine rings, when present, may be symmetrical or unsymmetrical. Illustrative of 2,2'-bipyridines are 2,2'-bipyridine, 4,4'-dimethyl-2,2'-bipyridine, 4,4'-dichloro-2,2'-bipyridine and 4,4'-dimethoxy-2,2'-bipyridine. Particularly preferred as the bidentate nitrogen ligand is 2,2'-bipyridine.

When bidentate nitrogen ligands are employed, quantities of ligand from about 0.5 mol to about 200 mol per mol of palladium compound are satisfactory with quantities from about 1 mol to about 50 mol per mol of palladium compound being preferred.

Although not required, it is useful on occasion to add a quinone as an additional catalyst component which serves to enhance catalyst activity. Suitable quinones are quinones of from 6 to 10 carbon atoms inclusive and are benzoquinones, naphthaquinones or anthraquinones. Preferred quinones are 1,4-quinones, particularly 1,4-benzoquinone. As stated, the use of a quinone is not required but when used amounts up to about 10,000 mol per mol of palladium compound are useful with amounts up to about 5,000 mol per mol of palladium compound being preferred.

The catalyst composition of the invention is employed in catalytic quantities. An amount of catalyst containing from about $1 \times 10^{-7}$ to about $1 \times 10^{-3}$ gram atom of palladium per mol of unsaturated compound to be polymerized (olefin plus vinyl compound) is satisfactory with amounts containing from about $1 \times 10^{-6}$ to about $1 \times 10^{-4}$ gram atom of palladium per mol of unsaturated compound being preferred.

The molar quantity of olefinic compound to be polymerized to carbon monoxide is from about 10:1 to about 1:5, preferably from about 5:1 to about 1:2.

The polymerization is carried out by contacting the reactants and catalyst under polymerization conditions. A polymerization temperature from about 20° C. to about 200° C., preferably from about 30° C. to about 150° C., is satisfactory. Suitable reaction pressures are from about 1 bar to about 200 bar, preferably from about 20 bar to about 100 bar. The contacting is effected by conventional means such as shaking or stirring and the reaction is conducted in the gaseous phase in the substantial absence of diluent or in the liquid phase in the presence of an inert diluent such as methanol or ethanol. Subsequent to reaction, the polymer product is recovered by conventional methods such as filtration or decantation. On occasion, the polymer product will contain residues of the catalyst which are removed by contacting with a material which is a solvent for the residues but in which the polymer is not soluble. The polymer products typically have molecular weights from about 10,000 to about 200,000 and melting points from about 200° C. to about 300° C.

The nature of the polymer product will be determined in part by the nature of the vinyl compound employed, but will contain regularly repeating carbonyl groups. In addition, however, the polymers of the invention contain pendant ether, amide or phosphonate groups depending upon the vinyl compound used in the polymerization. The presence of these pendant groups provides a polyketone of modified properties useful as a high performance thermoplastic having application in the production of parts for the auto industry, in the production of containers for food and drink and as construction and building materials.

However, the pendant groups provide reactive sites attached to the polymer chain from which a variety of additional derivatives are produced. For example, use of a vinyl ether of formula I in the polymerization process results in the polymer having ether groups attached to the polymer chain. Upon healing, alcohol is recovered affording polymer chains containing ethylenic unsaturation. Use of a vinyl amide in the polymerization leads to polymers having amide substituents which, upon hydrolysis, results in substituents which are amines or carboxyl groups, depending on whether vinyl amides of formula II or formula III were used. In like fashion, use of vinyl phosphonates leads to polymers with pendant phosphonate substituents which, upon hydrolysis, results in polymers with hydroxyl or phosphonic acid groups attached to the polymer chain, depending upon whether vinyl phosphonates of formula IV or formula V were employed as monomer.

The availability of so diverse a variety of polymer products leads to utilization in a number of applications where thermoplastic physical properties and/or functional chemical properties are desired.

The invention is further illustrated but not limited by the following Illustrative Embodiments.

ILLUSTRATIVE EMBODIMENT I

A terpolymer of carbon monoxide, ethylene and ethyl vinyl ether was produced by charging to an autoclave of 300 ml capacity a catalyst solution of 20 ml methanol, 0.1 mmol of palladium acetate, 0.5 mmol of copper para-tosylate (para-toluenesulfonate), 0.15 mmol of 1,3-bis(diphenylphosphino)propane and 2 mmol of 1,4-benzoquinone. After the introduction of 35 ml of ethyl vinyl ether into the autoclave, air was removed by evacuation and ethylene was added until a pressure of 15 bar was reached and carbon monoxide was then added until a pressure of 45 bar was reached. The contents of the autoclave were brought to a temperature of 90° C. After 5 hours, polymerization was terminated by cooling to room temperature and releasing the pressure. The polymer product formed was recovered by filtration, washed with methanol and dried in vacuo at room temperature. The terpolymer product, 6.6 g, had a melting point of 225° C.

ILLUSTRATIVE EMBODIMENT II

A terpolymer of carbon monoxide, ethylene and N-vinylpyrrolidone was produced by the procedure of Illustrative Embodiment I, except that 30 ml of N-vinylpyrrolidone were used in place of the ethyl vinyl ether and a reaction temperature of 70° C. instead of 90° C. was employed. The terpolymer product, 11.1 g, had a melting point of 250° C.

ILLUSTRATIVE EMBODIMENT III

A terpolymer of carbon monoxide, ethylene and diethyl vinylphosphonate was produced by a procedure substantially like that of Illustrative Embodiment I, except that (a) 10 ml of diethyl vinylphosphonate was introduced into the autoclave instead of ethyl vinyl ether, (b) the catalyst solution was 50 ml of methanol, 2 mmol of trifluoroacetic acid and 0.15 mmol of 1,3-bis(diphenylphosphino)propane, and (c) the reaction temperature was 80° C. instead of 90° C.

The terpolymer product, 3.3 g, had a melting point of 250° C.

With the aid of $^{13}$C-NMR analysis, it was determined that the polymers of Illustrative Embodiment I–III were made up of units of the structure $$-\overset{O}{\underset{\|}{C}}(C_2H_4)-$$

and units of the structures $$-\overset{O}{\underset{\|}{C}}(C_4H_8O)-,\ -\overset{O}{\underset{\|}{C}}(C_6H_9ON)- \text{ and } -\overset{O}{\underset{\|}{C}}(C_6H_{13}O_3P)-$$

respectively. The ratio of units incorporating ethylene to those incorporating the second ethylenically unsaturated monomer was 1000, 160 and 100 respectively.

What is claimed is:

1. In the process of producing linear alternating terpolymers of carbon monoxide and two ethylenically unsaturated compounds under polymerization conditions in the presence of a catalyst formed from a palladium compound, the anion of a non-hydrohalogenic acid having a pKa less than about 4 and a bidentate ligand of phosphorus or nitrogen, the improvement wherein the two ethylenically unsaturated compounds are a hydrocarbyl α-olefin of from 2 to 20 carbon atoms inclusive and a hydrocarbyl vinyl compound of from 3 to 30 carbon atoms inclusive selected from vinyl ether, vinyl amide or vinyl phosphonate of the formula $$CH_2=CH-O-\underset{\underset{O-R_1}{|}}{\overset{\overset{O}{\|}}{P}}-R_1 \text{ or } CH_2=CH-\underset{\underset{O-R_1}{|}}{\overset{\overset{O}{\|}}{P}}-O-R_1$$

wherein $R_1$ is alkyl or aryl.

2. The process of claim 1 wherein the α-olefin is ethylene.

3. The process of claim 2 wherein the vinyl compound is vinyl ether of the formula $$CH_2=CH-O-R_1$$

wherein $R_1$ is alkyl or aryl.

4. The process of claim 3 wherein the vinyl ether is ethyl vinyl ether.

5. The process of claim 2 wherein the vinyl compound is vinyl amide of the formula $$CH_2=CH-\underset{\underset{}{\overset{R_1}{|}}}{N}-\overset{\overset{O}{\|}}{C}-R_2$$

wherein $R_1$ is alkyl or aryl and $R_2$ is $R_1$, H or $R_1$ and $R_2$ taken together form an alkylene group of from 2 to 6 carbon atoms inclusive, or of the formula $$CH_2=CH-\overset{\overset{O}{\|}}{C}-\underset{}{\overset{R_2}{N}}-R_2$$

wherein $R_2$ is as defined above.

6. The process of claim 5 wherein the vinyl amide is N-vinylpyrrolidone.

7. The process of claim 2 wherein the vinyl compound is vinyl phosphonate of the formula $$CH_2=CH-O-\underset{\underset{O=R_1}{|}}{\overset{\overset{O}{\|}}{P}}-R_1$$

$$CH_2=CH-O-\underset{\underset{O-R_1}{|}}{\overset{\overset{O}{\|}}{P}}-R_1 \text{ or}$$

$$CH_2=CH-\underset{\underset{O-R_1}{|}}{\overset{\overset{O}{\|}}{P}}-O-R_1$$

wherein $R_1$ is alkyl or aryl.

8. The process of claim 2 wherein the vinyl phosphonate is O,O'-diethylvinylphosphonate.

9. The linear alternating terpolymer having repeating units of the formula $$+\overset{O}{\underset{\|}{C}}+A\xrightarrow{}_a+\overset{O}{\underset{\|}{C}}+B\xrightarrow{}_b$$

wherein A is the moiety of a hydrocarbyl α-olefin of from 2 to 20 carbon atoms inclusive polymerized through the ethylenic unsaturation and B is the moiety of a hydrocarbyl vinyl compound of from 3 to 30 carbon atoms inclusive, said compound being selected from vinyl ethers, vinyl amides or vinyl phosphonate of the formula

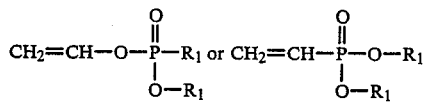

wherein $R_1$ is alkyl or aryl, polymerized through the vinyl linkage.

10. The terpolymer of claim 9 wherein the α-olefin is ethylene.

11. The terpolymer of claim 10 wherein the vinyl compound is vinyl ether of the formula

wherein $R_1$ is alkyl or aryl.

12. The terpolymer of claim 11 wherein the vinyl ether is ethyl vinyl ether.

13. The terpolymer of claim 10 wherein the vinyl compound is vinyl amide of the formula

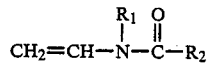

wherein $R_1$ is alkyl or aryl and $R_2$ is $R_1$, H or $R_1$ and $R_2$ taken together form an alkylene group of from 2 to 6 carbon atoms inclusive, or of the formula

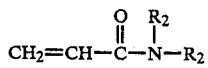

wherein $R_2$ is as defined above.

14. The terpolymer of claim 13 wherein the vinyl amide is N-vinylpyrrolidone.

15. The terpolymer of claim 10 wherein the vinyl compound is vinyl phosphonate of the formula

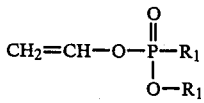

or

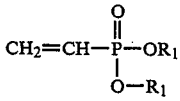

wherein $R_1$ is alkyl or aryl.

16. The terpolymer of claim 15 wherein the vinyl phosphonate is O,O'-dimethylvinylphosphonate.

* * * * *